Oct. 5, 1926.

H. E. HARRIS

ART OF DRYING

Filed Jan. 4, 1921

Inventor
Howard E. Harris
By
Atty.

Patented Oct. 5, 1926.

1,601,966

UNITED STATES PATENT OFFICE.

HOWARD E. HARRIS, OF ISLIP, NEW YORK, ASSIGNOR, BY MESNE ASSIGNMENTS, TO THE INDUSTRIAL DRYER CORPORATION, OF STAMFORD, CONNECTICUT, A CORPORATION OF CONNECTICUT.

ART OF DRYING.

Application filed January 4, 1921. Serial No. 434,929.

This invention pertains to the art of drying, and includes both a mode of procedure and novel mechanism whereby a drying atmosphere is recirculated until it attains a certain saturation with moisture from the material under treatment, whereupon the moist air is replaced in whole or in part with fresh air, and thereupon the recirculation is continued until the drying atmosphere again attains the desired humid condition, the specified operations of recirculating the atmosphere and of replacing the same in whole or in part with fresh air being repeated alternately until the material shall have attained the desired dry condition.

Broadly stated, the invention consists of humidity controlled means for periodically renewing a drying atmosphere to be circulated within a closed circulatory path.

In this invention the drying atmosphere is successively circulated into contact with moist material and with an air heater or radiator supplied with steam the heat radiated from which is taken up by the drying atmosphere, which radiation of heat results in condensation of the steam within the radiator. The condensate is accumulated in a chamber with which is connected a piston valve adapted to be actuated by the accumulated condensate for the operation of a controlling valve, the latter being positioned in a closed circulatory path for the drying atmosphere.

With this brief statement of the nature of the invention, the improvement in the art of drying consists in circulating a drying atmosphere within a closed path which includes a material-containing chamber and a chamber for a steam heated radiator acting to radiate heat for absorption by the drying atmosphere and concurrently with such recirculation of the drying atmosphere the collection of the condensate from the steam radiator in a chamber separate from the circulatory path, such collection of the condensate and the circulation of the drying atmosphere being continued until said atmosphere attains a desired degree of saturation by moisture from the material; then opening a vent for the exit of the drying atmosphere, in whole or in part, and for the ingress of a volume of fresh air which replaces, in whole or in part, the atmosphere previously circulated and utilizing the accumulated condensate for the operation of a valve which opens and closes said vent for the outlet of the humid atmosphere and the ingress of fresh air to the circulatory path.

In respect to the apparatus, the invention includes a controlling valve positioned in the circulatory path for the drying atmosphere and at a point adjacent to the valve an exit for the moist atmosphere and an inlet for fresh air, combined with means for collecting the water of condensation generated by and incidental to the radiation of heat from a steam heated radiator, and a piston valve operatively connected with said controlling valve and with the condensate-collecting means, whereby the pressure from the steam radiator so acts upon the condensate, when a determined volume of said condensate shall have been accumulated, that the piston valve is actuated to shift the controlling valve for opening the moist air outlet and the fresh air inlet, said piston valve being itself movable to a position for opening an outlet for the collected condensate, with the result that the accumulated condensate is ejected concurrently with the opening of the moist air outlet and the fresh air inlet.

The rate of generation of the condensate within the steam heated radiator is in a definite ratio to the saturation of the drying atmosphere by absorption of moisture from the material under treatment, so that the frequency of operation of the controlling valve for the moist air exit and the fresh air inlet is responsive directly to, or controllable primarily by, the volume of the condensate following the radiation of heat from the radiator into such recirculating drying atmosphere. Thus, at an early stage in the drying wherein the material gives off its moisture freely and the drying atmosphere becomes quickly saturated to the desired extent with moisture, the condensate is generated and collected with comparative rapidity, as a result of which the piston valve and the controlling valve are operated at relatively frequent intervals for the discharge of the condensate and the renewal of the air supply; but as the evaporation progresses, and the moisture content of the material decreases, the drying atmosphere requires a longer period to attain the desired saturation and the generation of the condensate takes place correspondingly more slowly, hence it follows that the controlling valve and the piston valve are opened with less frequency, as a result of which the drying atmosphere is recirculated for a relatively longer period of time within the closed circulatory path, thereby attaining economy in the steam required by the radiator for the maintenance of the drying atmosphere in the desired condition for the preformance of the drying operation.

Other functions and advantages of the invention will appear from the following description taken in connection with the drawings, wherein—

A designates a drier of approved construction, having a treating chamber $a$ wherein is positioned a series of material-carrying elements herein shown as trays B, the latter being mounted on a wheeled truck C for introducing and removing the trays collectively with reference to said drier.

The drier is equipped with a chamber $a'$ within which is positioned a steam heated radiator D composed usually of coils connected at their lower ends by a header $d$, from which leads a pipe $d'$ to a trap E of any approved form, said pipe $d''$ being shown as terminating in an upturned branch $e$ extending into a movable element $e'$ of the trap (see Figure 3), although it will be understood that I reserve the right of using any desired form of steam trap.

Figure 1:
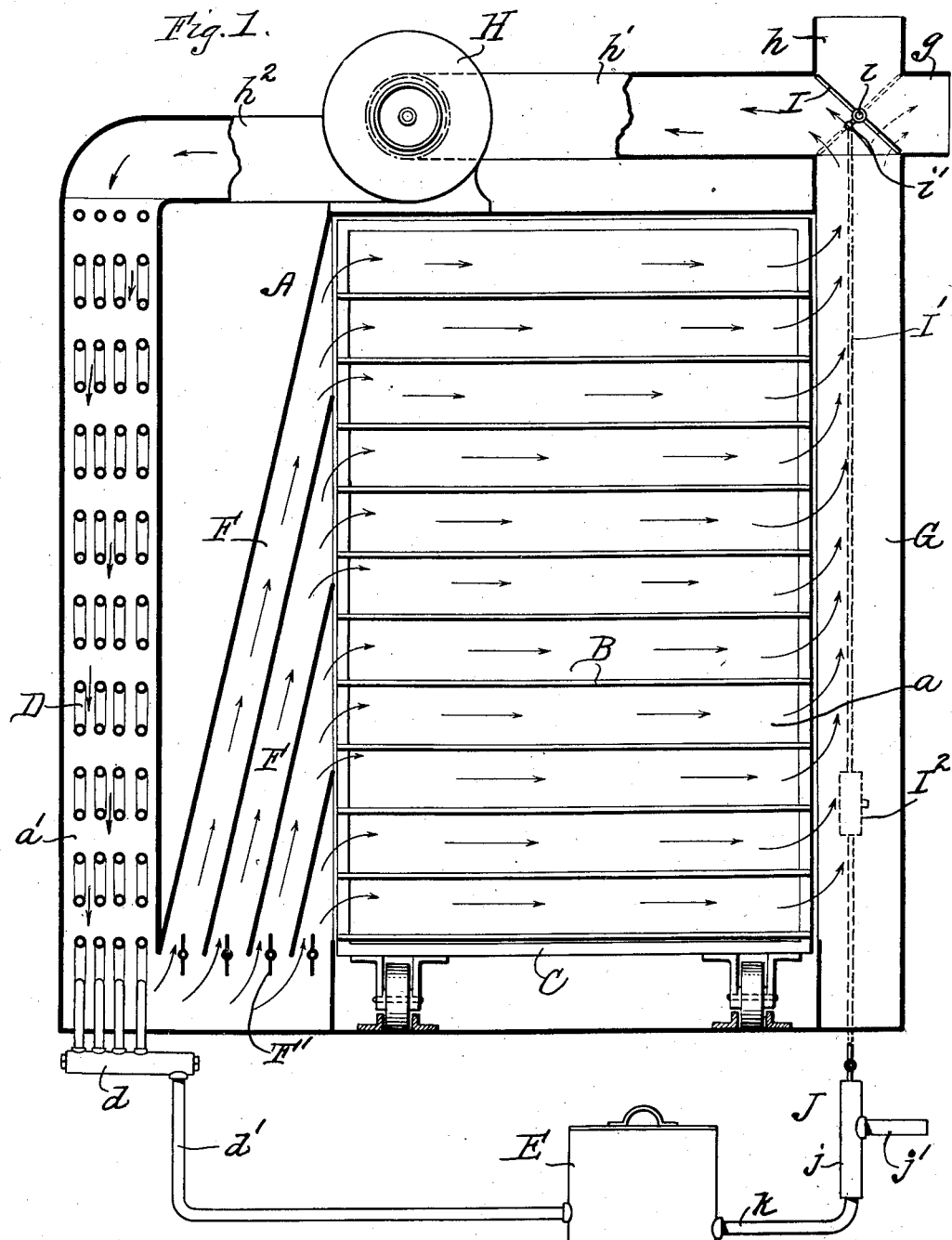
Figure 1 is a vertical section partly in elevation of a dryer embodying my invention, the arrows showing the path of the recirculating drying atmosphere.
Figure 2:
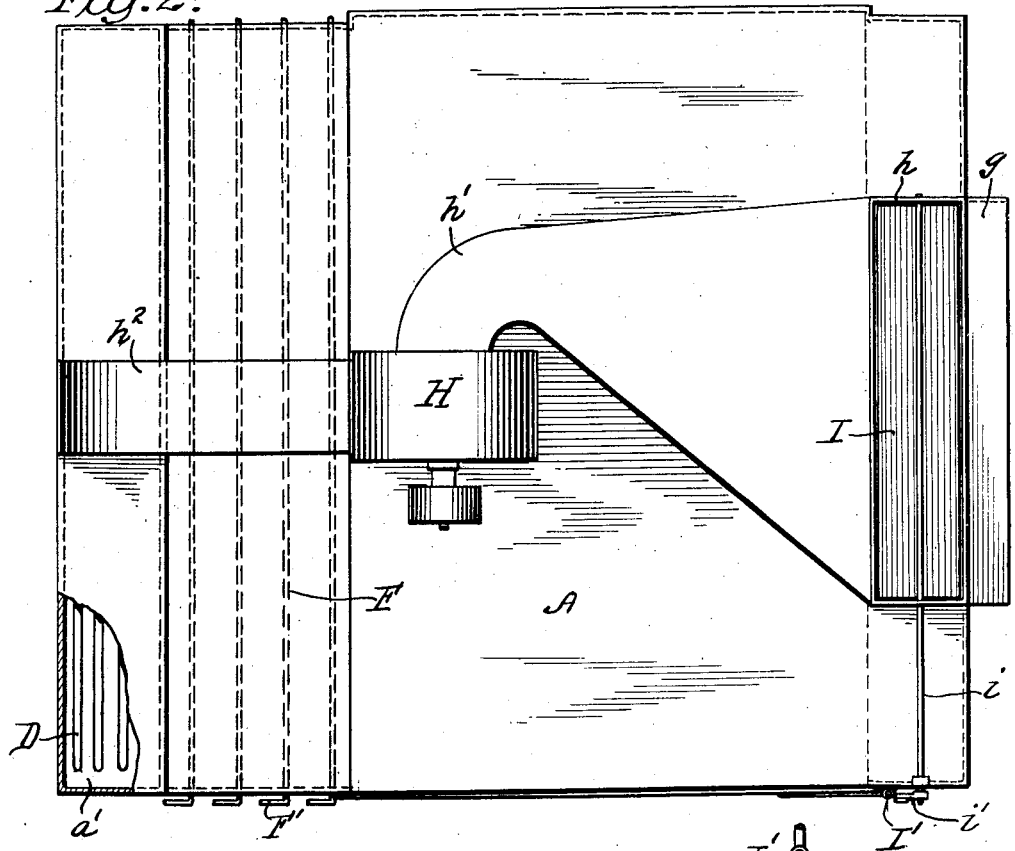
Figure 2 is a plan view thereof.

Radiator chamber $a'$ is in communication with the treating chamber $a$ for the material on the trays, but as shown in Figure 1, means are provided for equalizing the flow from the radiator chamber to the trays within said treating chamber, said equalizing means being shown as a plurality of flues F and a corresponding plurality of dampers F'. The flues vary in length and are inclined so that the air flows in practically equal volumes and at the desired velocity across the trays, the dampers F' affording suitable hand controlled means for regulating the volumes of air flowing from the radiator chamber to the treating chamber.

G is an eduction flue in direct communication with the treating chamber $a$, said flue providing for the free flow of air from the treating chamber. The eduction flue extends upwardly for a desired distance, and it is in communication with a moist air outlet $g$ and a fresh air inlet $h$.

H is an air circulating device, shown as a blower mounted upon the drier, the intake of said blower being connected by a duct $h'$ to the eduction flue G whereas the outlet of the blower is connected to a duct $h^2$ connected to the radiator chamber $a'$.

I is the controlling valve positioned in the eduction flue G at a point adjacent the moist air outlet $g$ and the fresh air inlet $h$. Said valve is shown as a damper hung on a rod $i$ and provided with a crank arm $i'$, to which is connected a valve rod I' leading to a piston valve J. Said controlling valve I normally occupies the full line position of Figure 1 so as to close the exit $g$ and the inlet $h$ and to open the communication from the eduction flue G to the blower.

Figure 3:
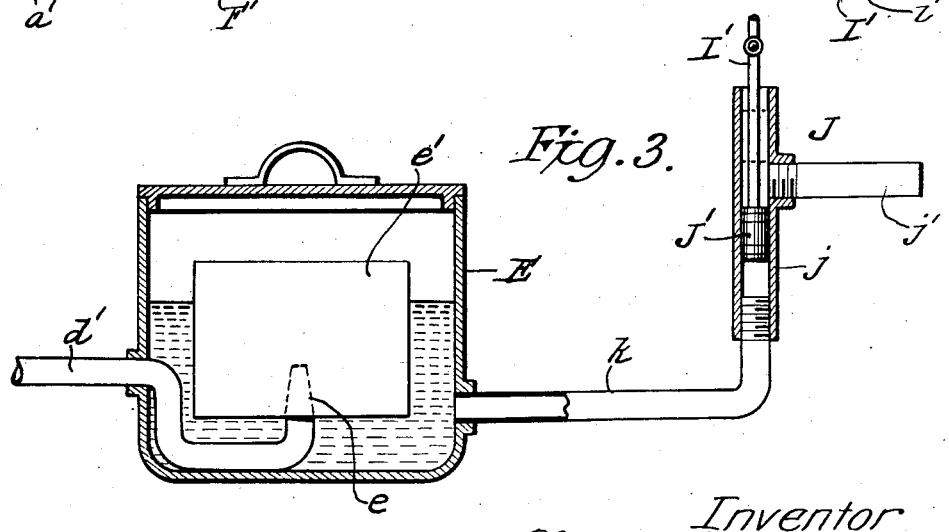
Figure 3 is a detail sectional elevation of one form of piston valve controllable by the condensate adapted to be collected in a trap of one form or another.

Various kinds of valves may be used for control by the condensate accumulated in the trap and operable for shifting the controlling valve I; but as shown in Figure 3 a piston valve is employed in the embodiment of the invention as herein disclosed. Said piston valve comprises a shell or closing $j$ having an exit branch $j'$ normally open to atmosphere, and a piston J' slidable within the valve shell. The piston is attached to and is movable with the valve rod I'; said rod being provided with a counterpoise I$^2$ (see dotted lines in Figure 1), for effecting the positive return of the piston valve and the controlling valve to their normal positions. To the lower end of valve casing $j$ is attached a pipe $k$, the other end of which is coupled to trap E, thus making provision for the admission of the condensate from the trap to the chamber below piston J'.

The drying atmosphere flows normally within a closed circulatory path constituted by chamber $a$, flue G, duct $h'$, blower H, duct $h^2$, chamber $a'$ and flues F, the controlling valve I being in the position shown by full lines in Figure 1 so as to open communication between flue G and duct $h'$, and said valve closing the exit $g$ and inlet $h$. The controlling valve I, and piston valve J', are retained in their normal positions by the weight of rod I' and the counterpoise I$^2$, said piston valve being normally in a position to shut off the exit of the condensate through the discharge port $j'$.

In operation, the material is loaded on trays B and the latter inserted into truck C, after which the loaded truck is run into the drier until the trays are interposed between equalizing flues F and eduction flue G. Steam is supplied to the radiator and the blower is started for setting the drying atmosphere into motion so as to flow within the closed circulatory path, the speed and capacity of the blower being such as to circulate the drying atmosphere at the required velocity and in the desired volume within the drier.

The flow of the drying atmosphere into contact with the material is attended by a reduction in the temperature of the drying atmosphere, the latter giving up some of its heat and taking up moisture from the material as the drying progresses, said atmosphere having been heated to a desired temperature by radiator D. The radiation of heat from and by the steam-heated radiator is attended by the condensation of steam in said radiator, resulting as usual in the presence of water of condensation within said radiator, the quantity of which condensate varies with the moisture evaporated from the material exposed to treatment by the atmosphere flowing into contact therewith. At the early stage in the evaporation, certain materials give off moisture with comparative freedom, and the drying atmosphere thus attains the desired moisture content with comparative rapidity, and concurrently therewith the heat emanating from the radiator results in the production of water of condensation or is the condensate in the same relative proportion, which condensate is collected in the trap until its volume is such as to lift member $e'$, whereupon the pressure of the steam against the liquid condensate forces upwardly the piston valve $J'$, whereby the valve is lifted to open the exit $j'$ for blowing out the accumulated condensate. At the same time, rod $I'$ is lifted by pressure against the piston valve in order to shift the controlling valve I from the full line position of Figure 1 to the dotted line position, the effect of which is to open the exit $g$ and inlet $h$, thereby interrupting the closed circulatory path so that the moist drying atmosphere, in whole or in part, is blown out of the exit $g$ and such atmosphere is replaced, in whole or in part, by fresh air drawn through inlet $h$ by the action of the blower. The opening of valves I J takes place at relatively frequent intervals during the early stages in the evaporation, so as to renew the air supply with comparative frequency for the efficient treatment of the material, but as the moisture content of the material decreases, there is a slower evaporation, hence the drying atmosphere attains the desired degree of saturation more slowly, and there is a corresponding decrease in the generation of the condensate in the radiator, with the result that the valves I J remain closed for longer periods of time and the drying atmosphere is circulated within the closed path for correspondingly increased periods of time without renewal of the air supply, thus effecting economy of steam for heating said atmosphere to a desired temperature during the later stages in the evaporation of the material, in which stages the moisture content thereof is relatively small so as to necessitate treatment for a comparatively longer period.

The trap E may be set in a manner known to those skilled in the art for the flow of the condensate and steam to piston valve upon the accumulation of such condensate at different volumes, thus making provision for the renewal of the air supply when the drying atmosphere attains more or less saturation of moisture. Again, the piston valve and the controlling valve are by adjustment of a counterpoise such as $I^2$ so as to open the controlling valve I for such a period as to wholly discharge the moist air and replace it with fresh air, or said valves may be operated for discharging a certain volume of moist air and replacing it with a like volume of fresh air.

It will be noted that in my invention the replacement of the moist air with fresh air, in whole or in part, is effected automatically, and that such replacement is dependent upon the generation of a condensate obtained by radiation of heat into the drying atmosphere, there being a direct relation between the generation of the condensate and the amount of moisture evaporated by the drying atmosphere from the material under treatment. The accumulated condensate is periodically ejected from the apparatus by automatic operation of the piston valve, and this automatic discharge of the condensate is effected concurrently with the renewal of the air supply, as a result of which the drier is automatically operated and controlled in a manner to carry on the evaporation at a rate dependent more or less upon the decreasing moisture content of the material.

Having thus fully described the invention, what I claim as new and desire to secure by Letters Patent is:—

1. In the art of drying, the process which consists in circulating a drying atmosphere successively into contact with the material and then with a steam radiator thereby evolving a condensate from the steam supplied to the radiator, and periodically replacing the moist drying atmosphere with fresh air by utilizing the condensate upon a predetermined volume being collected for opening and closing a moist air outlet and a fresh air inlet.

2. In the art of drying, the process which consists in circulating a drying atmosphere successively into contact with a steam radiator and then with moist material for such a period as results in the atmosphere attaining a desired humid condition thereby evolving a condensate from the steam supplied to said radiator, collecting said condensate until a desired quantity is accumulated, and utilizing the accumulated condensate upon a predetermined volume being collected for opening an outlet for the moist atmosphere and an inlet for fresh air whereby the drying atmosphere is renewed by the admission of fresh air at intervals dependent upon the humid condition of the drying atmosphere.

3. In the art of drying, the process which consists in circulating a drying atmosphere successively into contact with a steam radiator and with moist material until such atmosphere attains predetermined condition thereby evolving from the steam supplied to the radiator a condensate the generation of which is in a certain ratio to the humid condition attained by the atmosphere, collecting the condensate in a chamber separate from the circulatory path of said drying atmosphere, and utilizing the accumulated condensate upon a predetermined volume being collected for interrupting the continuity of the circulatory path so as to discharge humid air from and admit fresh air to said circulatory path.

4. In the art of drying, the process which consists in circulating a drying atmosphere within a closed circulatory path and into and out of contact with material until said atmosphere attains a desired humid condition, causing the heat transfer from a steam radiator into the drying atmosphere thereby evolving, from the steam supplied to the radiator, a condensate the volume of which is proportional to the humid condition attained by the drying atmosphere, periodically opening a moist air exit and a fresh air inlet to the circulatory path, and controlling said exit and inlet by the accumulated condensate after a predetermined volume has been collected.

5. In the art of drying, the process which consists in circulating a drying atmosphere within a closed circulatory path and into and out of contact with material until said atmosphere attains a desired humid condition, causing a heat transfer from a steam radiator into the drying atmosphere thereby evolving, from the steam supplied to the radiator, a condensate the volume of which is proportional to the humid condition attained by the drying atmosphere, and periodically renewing the drying atmosphere within said circulatory path by opening a moist air exit and a fresh air inlet to said circulatory path, the frequency of such renewal being dependent upon the time required for the accumulation to a definite volume of the condensate.

6. In the art of drying, the process which consists in circulating a drying atmosphere within a closed circulatory path and into and out of contact with material until said atmosphere attains a desired degree of humidity, casuing a heat transfer from a steam radiator into said atmosphere thereby evolving, from the steam supplied to the radiator a condensate the volume of which is relative to the moisture saturation attained by the drying atmosphere, periodically renewing the drying atmosphere within said circulatory path by opening a moist air exit from and a fresh air inlet to said circulatory path, and controlling the opening said exit and inlet by the accumulated condensate upon a predetermined volume being collected.

7. In the art of drying, the process which consists in circulating a drying atmosphere within a closed circulatory path and into and out of contact with material until said atmosphere attains a desired degree of humidity, radiating heat from a steam radiator into said atmosphere thereby evolving from the steam supplied to the radiator a condensate the volume of which is relative to the moisture saturation attained by the drying atmosphere, periodically renewing the drying atmosphere within said circulatory path by opening a moist air exit from and a fresh air inlet to said circulatory path, controlling the periodical opening of said exit and inlet by the accumulated condensate upon a predetermined volume being collected, and ejecting the accumulated condensate concurrently with the renewal of the drying atmosphere.

8. In the art of drying, the improvement which consists in periodically renewing a drying atmosphere circulating within a closed path by opening a moist air exit from and a fresh air inlet to said circulatory path, radiating heat into said drying atmosphere by a steam radiator thereby evolving from the steam a condensate, collecting said condensate in a chamber separate from the circulatory path, controlling the opening of said exit and inlet periodically by pressure supplied to said condensate upon a predetermined volume being collected, and discharging the accumulated condensate concurrently with each renewal of said drying atmosphere.

9. In the art of drying, the process which consists in circulating a drying atmosphere within a closed circulatory path having a fresh air inlet and a moist air exit, radiating heat into the drying atmosphere from a steam radiator collecting the condensate evolved from the steam supplied to the radiator in a chamber separate from the circulatory path, periodically opening the exit from and inlet to said circulatory path by the collection of a predetermined volume of water of condensation, a determined volume of the condensate collected within said chamber, whereby moist air is discharged from and fresh air admitted to said circulatory path at desired intervals for renewing said drying atmosphere, and discharging the condensate concurrently with said renewal of the drying atmosphere.

10. In a drier, the combination of means forming a circulatory path having a moist air exit and a fresh air inlet, said means including a material chamber and a chamber having therein a steam radiator, means for circulating a drying atmosphere through said circulatory path, means connected with said radiator for collecting a condensate from the steam supplied to said radiator, and valve mechanism adapted to be operated by the condensate upon a predetermined volume thereof being accumulated and controlling said exit and inlet for the circulatory path.

11. In a drier, the combination of means for circulating a drying atmosphere, means forming a circulatory path which includes a material chamber and a chamber having therein a steam radiator, a moist air exit and a fresh air inlet for said circulatory path, a valve normally closing the exit and the inlet and establishing a path for the flow of the drying atmosphere within said closed circulatory path, means connected with said radiator for collecting a condensate from the steam supplied to the radiator, and means operable by the volume of collected condensate for shifting said valve to open the exit and the inlet whereby the drying atmosphere is renewed within the circulatory path.

12. In a drier, the combination of means for circulating a drying atmosphere, means forming a circulatory path which includes a material chamber and a chamber having therein a steam radiator, a moist air exit and a fresh air inlet for said circulatory path, a valve normally closing the exit and the inlet and establishing a path for the flow of the drying atmosphere within said closed circulatory path, means connected with said radiator for collecting a condensate from the steam supplied to the radiator, a separate valve operable by a collected volume of the collected condensate for opening an exit through which the condensate is ejected, and operative connections between the first valve and the second valve whereby the first named valve is controlled for renewing the supply of drying atmosphere within the circulatory path concurrently with the discharge of said condensate.

13. In a drier, means forming a circulatory path having a moist air exit and a fresh air inlet and including also a material containing chamber and a chamber having therein a steam radiator, means for circulating a drying atmosphere within said circulatory path, a valve normally shutting off the escape of the atmosphere through the exit and the admission of fresh air through the inlet, means connected with said radiator for collecting a condensate from the steam supplied to said radiator, means for effecting the discharge periodically of the condensate by a collected volume of said condensate, and means for controlling the first named valve concurrently with the discharge of the condensate whereby the drying atmosphere is renewed and the accumulated condensate is ejected.

14. In a drier, means forming a circulatory path having a moist air exit and a fresh air inlet and including also a material containing chamber and a chamber having therein a steam radiator, means for circulating a drying atmosphere within said circulatory path, a valve normally shutting off the escape of the atmosphere through the exit and the admission of fresh air through the inlet, means connected with said radiator for collecting a condensate from the steam supplied to said radiator, a piston valve controlling an exit for the condensate and connected with said condensate collecting means so as to be operated by a collected volume of said condensate for opening the exit and discharging said collected condensate, and means for controlling the first named valve by said piston valve for effecting a renewal of the drying atmosphere concurrently with the discharge of the condensate.

15. In a drier, the combination of means having a circulatory path having a moist air exit and a fresh air inlet and including a material containing chamber and an air heater, a valve for normally closing the exit and the inlet, means for circulating a drying atmosphere within said closed circulatory path, and means for automatically controlling said valve to periodically open the exit and the inlet for renewing the drying atmosphere within said closed circulating path.

16. In a drier, the combination of means for circulating a drying atmosphere within means forming a definite circulatory path, said path having a moist air exit from and a fresh air inlet to said circulatory path, a valve positioned for normally shutting off the exit of moist air from and the inlet of fresh air to said path, and valve controlling means controllable by and responsive to a desired moisture content of the drying atmosphere for periodically actuating said valve for effecting a renewal of the drying atmosphere.

17. In a drier, the combination of means for circulating a drying atmosphere within means forming a definite circulatory path, said path having a moist air exit from and a fresh air inlet to said circulatory path, means for normally closing said exit and inlet, and humidity controlled means for actuating said closing means to open the exit and the inlet upon the drying atmosphere attaining a desired moisture content whereby the drying atmosphere is periodically renewed within said circulatory path.

18. In a drier, the combination of means for circulating a drying atmosphere within a closed circulatory path, and humidity-controlled means for periodically replacing said atmosphere with fresh air.

19. In a drier, the combination of means for circulating within a closed path a drying atmosphere until the same attains a desired degree of saturation, and means exposed to the flow of said drying atmosphere and responsive to a predetermined degree of saturation for periodically renewing said drying atmosphere within said closed circulatory path.

20. In the art of drying, the process which consists in circulating a drying atmosphere within a closed circulatory path until the atmosphere attains a desired degree of saturation and periodically renewing the drying atmosphere by replacing said atmosphere within the circulatory path with fresh atmospheric air, the frequency of such periodic renewals being dependent upon the degree of saturation of the atmosphere circulating within said closed path.

In testimony whereof, I have hereto signed my name this 22nd day of December, 1920.

HOWARD E. HARRIS.